2,726,958
Patented Dec. 13, 1955

2,726,958
METHOD OF TREATING SOFT-BODIED FRUITS

George A. Fisher, Selinsgrove, Pa., assignor to The C. H. Musselman Company, Biglerville, Pa., a corporation of Pennsylvania No Drawing. Application June 25, 1953,
Serial No. 364,200

9 Claims. (Cl. 99—102)

The present invention relates to a method of treating soft-bodied fruits. The ultimate objective of the invention is to provide an improved method of preparing cherry-pie mix, and the invention will be described in detail in that connection; but at least some phases of the invention are applicable to the treatment of cherries and/or other soft bodied fruits for other uses, and still other phases of the invention are applicable to the preparation of other types of fruit-pie mixes.

The primary objects of the invention are to avoid rupture of the fruit during heating for pasteurization, to attain uniformity and smoothness of mixture of the several ingredients of the end product, and to overcome other difficulties which have heretofore been found insurmountable in known procedures for manufacturing similar products.

To the accomplishment of the above and related objects, my invention may be embodied in the steps described in the following specification, attention being called to the fact, however, that the specific procedures described are by way of illustration only and that changes may be made therein, so long as the scope of the appended claims is not violated.

Many soft-bodied fruits must be coated and/or impregnated with sugar in order to make them acceptable as canned or preserved fruits on the market. Likewise, many such fruits must be processed for the removal and rejection of inedible or otherwise unacceptable parts thereof, before being treated wtih sugar. It has been found that, if such fruits are chilled preliminarily, the processing steps can be accomplished with minimum damage to the natural texture of the fruits. However, particularly when the fruits are so chilled, rupture is very likely to occur as the fruits are subsequently heated, in contact with a sugar syrup, for pasteurization.

Cherries, for instance, must be pitted before packaging as ingredients of a pie mix, for instance. It has been found that minimum texture damage results from the pitting process if the cherries are preliminarily cooled to a temperature below 50° F. but above the freezing point of the cherries; and I presently believe that an optimum temperature for a pitting process lies between 40° and 50° F.

After pitting, and with or without a preliminary surface washing, the cherries must be mixed with a sugar syrup; and before the product is ready for packaging, the cherries must be heated, in contact with the syrup, to a temperature of approximately 205° F., at which temperature they should be held for a period of approximately one to two minutes.

If the mixture of cherries in syrup is heated rapidly, particularly if the cherries are cold just before the heating step begins, a very substantial portion of the fruit will rupture as the temperature attains a value of 150° to 155° F. I have discovered that, if the cherries and syrup are heated slowly to a temperature of approximately 150° F., such rupturing will not occur; and that, once that temperature has been attained, the mixture may be heated rapidly therefrom to a pasteurizing temperature of approximately 205°, without causing such rupture. I find that, if the temperature of the mixture is raised to approximately 150° F. in a period of not less than three minutes, and preferably not more than five minutes, the mixture can thereafter be heated rapidly, to bring the temperature thereof to approximately 205° in another 1½ to 2½ minutes, without deleterious effect upon the fruit. The first mentioned period is roughly variable in accordance with the starting temperature. That is, if the temperature of the fruit is approximately 40° when the heating step is begun, a period of about five minutes should be allowed for raising the temperature of the fruit to 150° F.

It is conventional, when preparing a commercial cherry pie mix, to mix the raw fruit with a syrup containing sugar in concentration of 60% to 70%, and containing, also, a conventional proportion of starches and/or gums and pectins as a thickening agent. It is recognized that uniformity of mixture of the several ingredients is very difficult when dry starch is added to a sugar syrup of such concentration. I presently believe that the difficulty is due to the fact that the syrup of such concentration does not provide enough water available to hydrate the starch completely and readily. Consequently, such a syrup to which dry starch is so added, is usually lumpy and too thick to pump readily or to mix uniformly with cherries.

According to my process, these difficulties are completely overcome in the following manner. I prepare a relatively weak sugar syrup, to a concentration of 35% or less. I add the cherries to this syrup and mix them thoroughly in order to coat the cherries uniformly with the thin syrup. I prepare a dry mixture of the desired amount of starch with sufficient sugar to increase the concentration of the syrup batch to the desired level, for instance, 60 to 70 percent, and I add this dry mixture to the coated cherries and residual syrup. Thorough mixing of these ingredients readily produces a uniform, homogeneous syrup in which the ingredients of the dry mixture have uniformly absorbed the liquid in the syrup, and in which the cherries are uniformly coated with the starch-containing, concentrated sugar syrup.

Now, this homogeneous mixture is subjected to the two-step heating process above described. If a period of three to five minutes is allowed for raising the temperature of the mixture to approximately 150° F., the temperature may thereafter be promptly raised to 205° F. in a further period of 1½ to 2½ minutes without producing any substantial degree of rupture in the bodies of the cherries.

The mixture is held at the pasteurizing temperature for a period of from one to two minutes; and thereafter the mixture is packaged in accordance with conventional procedure.

As has been said above, while the process is described herein in detail only in connection with the preparation of a cherry-pie mix, it is equally applicable, without substantial modification, to the preparation of other types of fruit-pie mixes.

The expression "a thickening agent," as used in the appended claims, is intended to refer to edible starches, gums and pectins, separately or in any combination.

I claim as my invention:

1. The method of preparing a product capable of use as a fruit-pie mix which comprises the steps of mixing together a batch of fruit and a sugar syrup having a concentration of approximately 30–35% to coat the fruit substantially uniformly with the syrup, adding to the coated fruit and residual syrup a dry mixture of sugar and a thickening agent, the sugar in such dry mixture being sufficient to increase the concentration of such syrup to approximately 60–70%, mixing the said ingredients to effect substantially uniform absorption of liquid by the sugar and thickening agent, heating the mixture slowly to a temperature of approximately 150° F. and thereafter heating the mixture rapidly to approximately 205° F.

2. The method of preparing a product capable of use as a fruit-pie mix which comprises the steps of mixing together a batch of chilled fruit and sugar syrup at room temperature or below, such syrup having a concentration of approximately 30–35% to coat the fruit substantially uniformly with syrup, adding to the coated fruit and residual syrup a dry mixture of sugar and a thickening agent, the sugar in such dry mixture being sufficient to increase the concentration of such syrup to approximately 60–70%, mixing the ingredients to effect substantially uniform absorption of liquid by the sugar and thickening agent, heating the mixture slowly to raise the temperature thereof to approximately 150° F. in 3 to 5 minutes, promptly thereafter heating the mixture more rapidly to raise the temperature thereof to approximately 205° F. in 1½ to 2½ minutes, and holding the mixture at the last-mentioned temperature for at least 1½ minutes to clarify the thickened mixture.

3. The method of preparing a product capable of use as a fruit-pie mix which comprises the steps of mixing together a batch of chilled fruit and a sugar syrup at room temperature or below, such syrup having a concentration of approximately 30–35%, to coat the fruit substantially uniformly with the syrup, adding to the coated fruit and residual syrup a dry mixture of sugar and a thickening agent, the sugar in such dry mixture being sufficient to increase the concentration of such syrup to approximately 60–70%, mixing the ingredients to effect substantially uniform absorption of liquid by the sugar and thickening agent, heating the mixture slowly to raise the temperature of the fruit to approximately 150° F. in 3 to 5 minutes, and promptly thereafter heating the mixture more rapidly to raise the temperature of the fruit to approximately 205° F. in 1½ to 2½ minutes.

4. The method of treating soft-bodied fruits which comprises the steps of mixing together a batch of chilled fruit and a syrup containing sugar to coat the fruit, then heating the mixture slowly to a temperature of approximately 150° F., and promptly thereafter heating the mixture more rapidly to a temperature of approximately 205° F.

5. The method of treating soft-bodied fruits which comprises the steps of mixing together a batch of chilled fruit and an excess of syrup containing sugar to coat the fruit substantially uniformly, then heating the mixture slowly to raise its temperature to approximately 150° F. in 3 to 5 minutes, and promptly thereafter heating the mixture more rapidly to raise its temperature to approximately 205° F. in 1½ to 2½ minutes.

6. The method of treating soft-bodied fruits which comprises the steps of mixing together a batch of chilled fruit and an excess of syrup containing sugar to coat the fruit substantially uniformly, then heating the mixture slowly to raise its temperature to approximately 150° F. in not less than 3 minutes, and promptly thereafter heating the mixture more rapidly to raise its temperature to approximately 205° F. in not more than 2½ minutes.

7. The method of preparing cherries for use which comprises the steps of chilling the cherries to a temperature below 50° F., pitting the cherries while cold, mixing the pitted cherries with an excess of syrup containing sugar to coat the fruit substantially uniformly, then heating the mixture slowly to raise its temperature to approximately 150° F. in 3 to 5 minutes, and promptly thereafter heating the mixture more rapidly to raise its temperature to approximately 205° F. in 1½ to 2½ minutes.

8. The method of preparing cherries for use which comprises the steps of chilling the cherries to a temperature below 50° F., but above the freezing point of the cherries, pitting the cherries while cold, mixing the pitted cherries with an excess of syrup containing sugar to coat the fruit substantially uniformly, then heating the mixture slowly to raise its temperature to approximately 150° F. in 3 to 5 minutes, and promptly thereafter heating the mixture more rapidly to raise its temperature to approximately 205° F. in 1½ to 2½ minutes.

9. The method of preparing a cherry-pie mix which comprises the steps of chilling the cherries to a temperature below 50° F., pitting the cherries while cold, mixing the cold, pitted cherries with a sugar syrup at room temperature or below, such syrup having a concentration of approximately 30–35%, to coat the cherries substantially uniformly with the syrup, adding to the coated cherries and residual syrup a dry mixture of sugar and starch, the sugar in such dry mixture being sufficient to increase the concentration of such syrup to approximately 60–70%, mixing the ingredients to effect substantially uniform absorption of liquid by the sugar and starch, heating the mixture slowly to raise the temperature of the cherries to approximately 150° F. in 3 to 5 minutes, and promptly thereafter heating the mixture more rapidly to raise the temperature of the cherries to approximately 205° F. in 1½ to 2½ minutes.

References Cited in the file of this patent

UNITED STATES PATENTS

| | | |
|---|---|---|
| 1,906,295 | Wickendon | May 2, 1933 |
| 2,340,145 | Rogers | Jan. 25, 1944 |

OTHER REFERENCES

"Commercial Fruit and Vegetable Products," by Cruess, third edition, McGraw-Hill Book Company, New York, 1948, page 412.

"Everybody's Cookbook," by Lord, revised edition, Harcourt, Brace and Company, New York, pages 185 and 438.

"The American Woman's Cook Book," by Berolzyheimer, Consolidated Book Publishers, Chicago, 1945, page 667.